United States Patent [19]
Dequin et al.

[11] Patent Number: 6,142,413
[45] Date of Patent: Nov. 7, 2000

[54] DEVICE FOR CONTROL OF AN AERODYNAMIC STEERING SURFACE OF A HELICOPTER

[75] Inventors: André-Michel Dequin, Aix-en-Provence; Valéry Lionel Delisle, Pourrieres; Pascal Leguay, Vernegues, all of France

[73] Assignee: Eurocopter, Cedex, France

[21] Appl. No.: 09/167,614

[22] Filed: Oct. 6, 1998

[30] Foreign Application Priority Data

Oct. 7, 1997 [FR] France ................................ 97 12453

[51] Int. Cl.[7] .................................................... B64C 27/82
[52] U.S. Cl. ..................................... 244/17.13; 244/17.21
[58] Field of Search ............................ 244/17.11, 17.13, 244/17.19, 17.21

[56] References Cited

U.S. PATENT DOCUMENTS

| | | | |
|---|---|---|---|
| 2,818,224 | 12/1957 | Sikorsky | 244/17.19 |
| 3,332,643 | 7/1967 | Toner | 244/17.21 |
| 3,404,737 | 10/1968 | Keder, Jr. | 244/17.19 |
| 3,833,188 | 9/1974 | Robinson | 244/17.19 |
| 5,388,785 | 2/1995 | Rollet et al. | 244/17.19 |
| 5,607,122 | 3/1997 | Hicks et al. | 244/17.21 |

FOREIGN PATENT DOCUMENTS

| | | |
|---|---|---|
| 0 566 452 A1 | 10/1993 | European Pat. Off. . |
| 2 167 249 | 8/1973 | France . |
| 2 338 845 | 8/1977 | France . |

OTHER PUBLICATIONS

French Search Report dated Jun. 18, 1998, 3 pages.

*Primary Examiner*—Galen L. Barefoot
*Attorney, Agent, or Firm*—Marshall, O'Toole, Gerstein, Murray & Borun

[57] ABSTRACT

The present invention relates to a device for control of an aerodynamic steering surface (D) of a helicopter (He), which includes an anti-torque system intended to counteract the torque induced by a main forward-movement and lifting rotor (R1) and comprising an anti-torque rotor (R2) exerting an anti-torque lateral thrust and said aerodynamic steering surface (D), controllable and generating an anti-torque transverse lift.

According to the invention, said device includes controls means (1A) for controlling said aerodynamic surface (D) in terms of speed, as a function of the difference between a helicopter (He) yaw control demand and a datum demand for the auxiliary rotor (R2), as long as said difference is not zero.

20 Claims, 4 Drawing Sheets

DEVICE FOR CONTROL OF AN AERODYNAMIC STEERING SURFACE OF A HELICOPTER

BACKGROUND OF THE INVENTION

The present invention relates to a device for control of an aerodynamic steering surface, such as a fin flap or an all-moving fin, of a helicopter. It also relates to a helicopter equipped with such a control device.

It is known, in a helicopter provided with a single main rotor providing lift and propulsion, that the fuselage has a tendency, in reaction to the torque exerted by said main rotor, to turn in the direction opposite to the direction of rotation thereof. It is known, moreover, that in order to combat the reaction torque to which the fuselage is subjected, it is usual to provide an auxiliary anti-torque rotor, capable of generating a transverse thrust and driven in rotation from the motive power source of the main rotor. Thus, the anti-torque auxiliary rotor picks off some of the power from this motive power source.

Another drawback of an anti-torque rotor lies in its induced drag, which may amount to half the thrust at high speeds, as well as in the induced noise which is liable to be very troublesome.

It results therefrom that, for the performance of the helicopter, it is advantageous for the anti-torque auxiliary rotor to be assisted in its function of anti-torque lateral stabilization of the fuselage.

As is set out, for example, in the patent U.S. Pat. No. 2,818,224, it is possible, to that end, to lighten the load on said anti-torque rotor, in translation flight, with the aid of an aerodynamic thrust being exerted on a fin provided at the rear of said helicopter. Such a thrust is usually obtained by choosing a cambered profile for the fin, and by setting the fin at a certain angle with respect to the plane of symmetry of the fuselage. However, for a fixed fin definition, the thrust thus obtained when the helicopter is flying at zero sideslip depends only on the dynamic pressure of the air on the fin and is therefore not variable. As the anti-torque force to be exerted varies in a different way as a function of speed, as well as as a function of other flight parameters, it results therefrom that the optimum load lightening for the anti-torque rotor is in practice possible only in a single set of flight conditions.

In order to avoid the drawbacks and limitations appearing in the use of such a fixed load-lightening fin, a fin flap can be employed, which is adjustable in terms of orientation.

The present invention applies exclusively to a helicopter equipped with a compound anti-torque system comprising:
an anti-torque auxiliary rotor, controllable and exerting an anti-torque lateral thrust ; and
an aerodynamic steering surface (a fin flap for example), controllable and generating anti-torque transverse lift.

As far as the principles of the control of such a fin flap are concerned, various flight control law concepts exist, known as deterministic concepts, that is to say which generate a deflection of the fin flap as a function of known flight condition parameters, this deflection being matched to the desired objective (according to a knowledge-based model). This control means, although useful in principle, is, by nature, not very robust as regards external aerodynamic changes (external carriage for example) and requires trimming in flight if the knowledge-based model turns out to be insufficiently accurate.

Moreover, the above-mentioned control means cannot generally be employed on every type of helicopter, or at the very least requires a modification, at least to the yaw control system of the helicopter.

SUMMARY OF THE INVENTION

The purpose of the present invention is to remedy these drawbacks. It relates to a device for control of an aerodynamic steering surface of a helicopter, which device can be fitted to any type of helicopter without having to modify the latter's yaw control system, which makes it possible to relieve the anti-torque rotor, that is to say to reduce its thrust (and thus to increase the performance of the helicopter and/or to reduce the flying costs), as well as the induced drag and noise, and which, moreover, makes it possible to preserve the authority of the helicopter's yaw control at every point of the flight envelope.

To that end, according to the invention, said device for control of an aerodynamic steering surface of a helicopter, said helicopter including a compound anti-torque system which is intended to counteract the torque induced by a main forward-movement and lifting rotor of the helicopter and which comprises:
an anti-torque auxiliary rotor, controllable and exerting an anti-torque lateral thrust ; and
said aerodynamic steering surface, controllable and generating an anti-torque transverse lift,
is noteworthy in that it includes controls means for controlling said aerodynamic surface in terms of speed, as a function of the difference between a helicopter yaw control demand and a datum demand representative of a datum control value for said auxiliary rotor, as long as said difference is not zero.

Hence, by virtue of the invention, if the action of said aerodynamic surface, preferably a fin flap or an all-moving fin, is sufficient, at equilibrium said auxiliary rotor achieves the datum control (or, if not, at least a control value close to it) and the aerodynamic surface exerts an action which is representative of the yaw control demand (or, if not, at least a demand close to it), which makes it possible to reduce the thrust from the auxiliary rotor as well as its induced drag and noise, and thus to increase the performance of the helicopter.

Moreover, when said datum demand is, as is preferred, the demand for which said auxiliary rotor exerts zero lateral thrust, the thrust from the auxiliary rotor is moreover thus advantageously canceled out at equilibrium.

Furthermore, since the control device in accordance with the invention is external to the yaw control system and does not have to be integrated into it in order to operate normally and effectively, it can be mounted on any type of helicopter, according to the various embodiments detailed below, without having to modify the yaw control system. Consequently, said control device also offers lower cost.

Moreover, according to the invention, said yaw control demand may:
either be representative of the action exerted by a pilot of the helicopter on a rudder pedal, which makes it possible to fit the device in accordance with the invention onto an ordinary helicopter with a mechanical flight control system ;
or be determined by a calculating unit, from actions exerted respectively on a collective lever and on a rudder pedal by at least one pilot of the helicopter.

Said calculating unit may correspond in particular to an electrical flight control system, equipping certain types of helicopters.

In a first advantageous embodiment of the invention, applied to a helicopter including at least one rudder pedal for controlling the helicopter in yaw and a rod linkage connected to said rudder pedal and to a member for actuating said auxiliary rotor, said control means advantageously comprise:

first means, preferably including a potentiometer, for measuring the value of the displacement of said rod linkage, which is representative of said yaw control demand;

second means for determining a control demand for the aerodynamic surface, from the value thus measured of the displacement of the rod linkage; and third means, preferably including an electric actuator or a motor, for actuating said aerodynamic surface in terms of speed, as a function of the control demand thus determined.

In this case, said control device moreover advantageously includes:

means for determining said datum demand, as a function of the lateral load factor of the helicopter in such a way as to augment the lateral static stability of said helicopter; and/or means for rendering said control device inactive.

Advantageously, these latter means are associated with means allowing a pilot of the helicopter to select, preferably manually, and to control at will, one of the following three deflection positions of said aerodynamic surface: the two extreme positions and the central position.

Furthermore, in order to adapt the device in accordance with the invention to the type of helicopter in question and/or to optimize it with respect to the flight configuration in question, it advantageously includes various means for setting, particularly:

a datum position of said rod linkage, from which said datum demand is determined; and/or the width of a dead control range, for which no control demand is forwarded to said third means for actuating the aerodynamic surface; and/or the width of an actuation range, for which said aerodynamic surface is actuated ; and/or the speed of actuation of said third means.

Moreover, in order to allow the pilot directly to have a good view of the actual situation of the control, the device in accordance with the invention further advantageously includes:

means for indicating to said pilot of the helicopter the actual value of the angle of deflection of the aerodynamic surface ; and/or means for warning said pilot when said aerodynamic surface is in one of its two extreme deflection positions.

Additionally, in a second particularly advantageous embodiment of the invention, said control means include:

a calculating unit, for determining a control demand for the aerodynamic surface, on the basis of the difference between the yaw control demand and the datum demand; and means for actuating said aerodynamic surface in terms of speed, as a function of the control demand thus determined.

This second embodiment is robust (as also is the first embodiment) with respect to the variations in the external aerodynamic configuration of the helicopter and, moreover, requires only minor trimming in flight.

Moreover, according to the invention, the conversion of said difference which corresponds to a control demand for the auxiliary rotor, into a value which corresponds to a control demand for the aerodynamic surface, is advantageously performed using a gain for conversion into effectiveness in terms of yaw moment.

Moreover, advantageously, said calculating unit determines said control demand for the aerodynamic surface by successively carrying out at least one conversion, an integration and a low-pass filtering of said difference between the yaw control demand and the datum demand.

DESCRIPTION OF THE DRAWINGS

The figures of the attached drawing will give a good understanding of how the invention can be produced. In these figures, identical references designate similar elements.

DETAILED DESCRIPTION OF THE PREFERRED EMBODIMENTS

Figure 1:
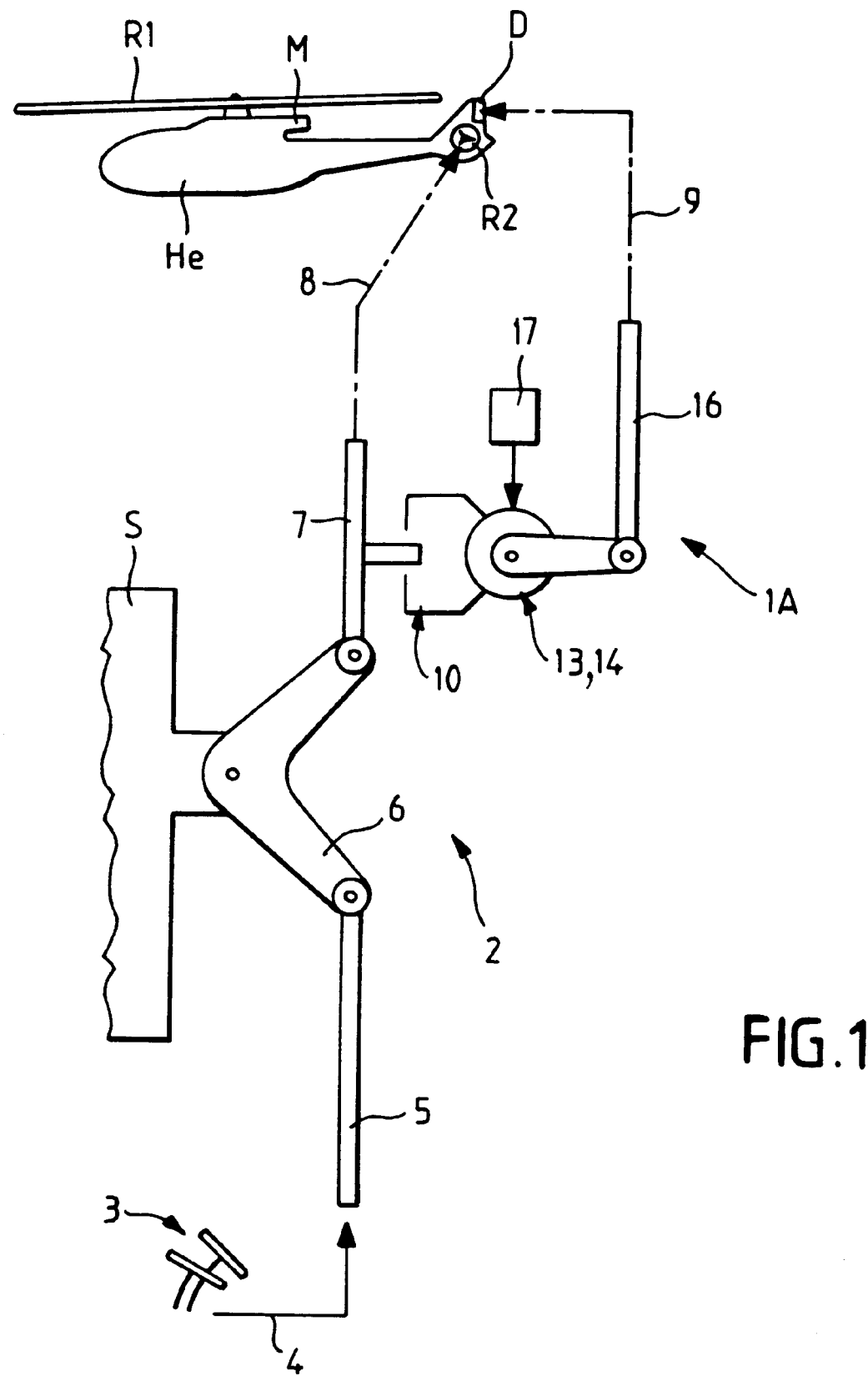
FIG. 1 diagrammatically illustrates, in principle, the operation of a control device in accordance with the invention, in a first embodiment.
Figure 5:
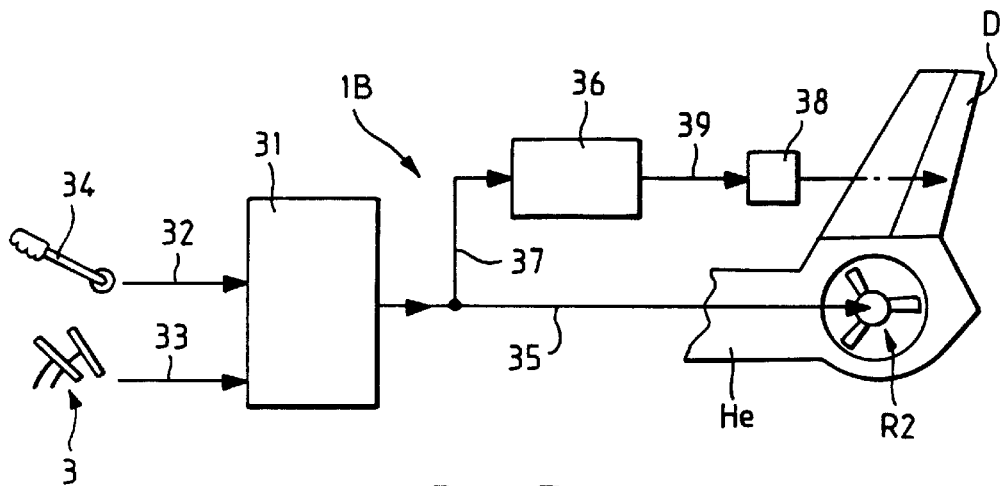
FIG. 5 diagrammatically illustrates a control device in accordance with the invention, in a second embodiment.

The control device in accordance with the invention and represented diagrammatically in FIGS. 1 and 5, respectively in two different embodiments 1A and 1B, is applied to a helicopter He equipped with a main rotor R1 for forward movement and lift.

Said control device 1A or 1B is intended to control an aerodynamic steering surface D, represented in the form of a fin flap on the drawing.

This fin flap D forms part of a compound anti-torque system of said helicopter He, which is for the purpose of counteracting the torque induced by said main rotor R1 and which comprises:

an anti-torque auxiliary rotor R2, controllable and exerting an anti-torque lateral thrust, which thrust is not represented; and said fin flap D, controllable in terms of orientation and generating an anti-torque transverse lift, which lift is also not represented.

Said control device 1A, 1B is particularly for the purpose of reducing the thrust from said auxiliary rotor R2 so as to increase the performance of the helicopter He.

The present invention further presents numerous other advantages specified below.

In the embodiment illustrated in FIG. 1, the invention is applied to a helicopter He represented diagrammatically at a reduced scale for reasons of clarity of the drawing and including a rod linkage 2 controlled by the actuation of a rudder pedal 3 by a pilot, not represented, of said helicopter He, as indicated by an arrow 4.

In a known way, said rod linkage 2, a connecting rod 5 of which is articulated to the structure S of the helicopter He by a bell crank 6, is linked, by means of a connecting rod 7, to at least one member, not represented, for actuating the blades of the rotor R2, so as to transmit to it the yaw control demand for the helicopter He generated by the actuation of said rudder pedal 3, as illustrated by an arrow 8.

Clearly, the above-mentioned means 5, 6 and 7 may in the known way be replaced by a cable-type control without bell crank.

In order to obtain the characteristics and the advantages sought, said device 1A includes control means detailed below for controlling said fin flap D in terms of speed, as illustrated by an arrow 9, as a function of the difference between the yaw control demand for the helicopter He and a datum demand representative of a datum control for said auxiliary rotor R2, this being so as long as said difference is not zero.

Figure 2:
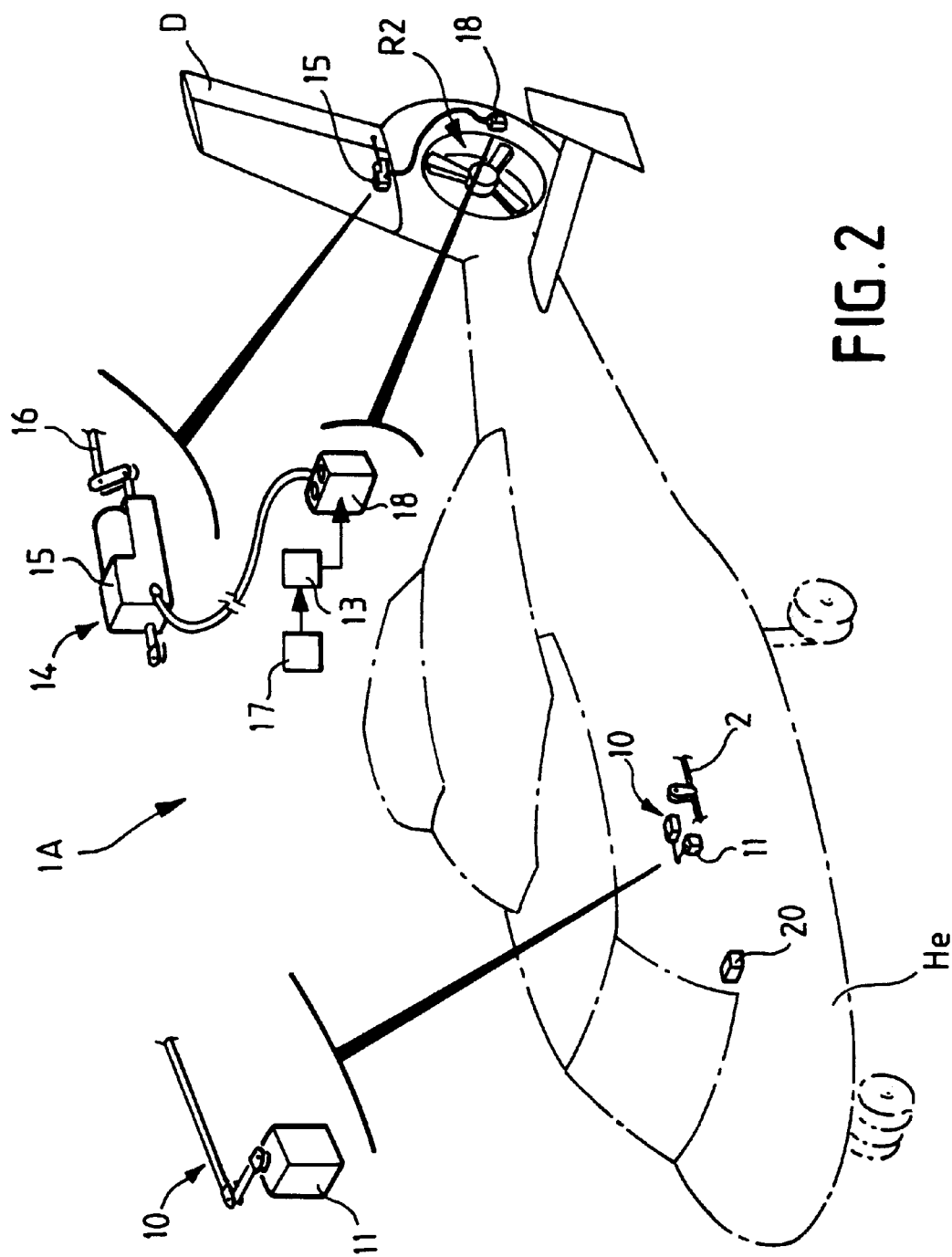
FIG. 2 diagrammatically shows a practical embodiment of the control device of FIG. 1.

According to the invention, said control means 1A, as represented in FIGS. 1 and 2, comprise:

means 10, comprising a potentiometer 11, for example, for measuring the value of the displacement of said rod linkage 2, which is representative of the pitch of the rotor R2, that is to say of said yaw control demand, generated by the actuation of the rudder pedal 3;

means 13 for determining, from the value thus measured of the displacement of the rod linkage 2 (or of the pitch of the rotor R2) and of the datum demand detailed below, a control demand for the fin flap D; and means 14 including an electric actuator 15 linked to a connecting rod 16, for actuating said fin flap D in terms of speed, as a function of the control demand thus determined, as illustrated by the arrow 9.

Hence, by virtue of the invention, if the action of the fin flap D is sufficient, at equilibrium said auxiliary rotor R2 achieves the datum control (or, if not, a control value close to it) and said fin flap D exerts an action which is representative of the yaw control demand (or, if not, close to it), which makes it possible to relieve the auxiliary rotor R2, to reduce its thrust as well as its induced drag and noise, and thus to increase the performance of the helicopter He.

Moreover, since said datum control value is preferably the control value for which said auxiliary rotor R2 exerts zero lateral thrust, the thrust of said auxiliary rotor R2 is not only reduced, but moreover canceled out at equilibrium, at high speed.

In fact, during forward flight, as the effectiveness of the fin flap D grows with the speed of the helicopter He, the pilot progressively releases the rudder pedal 3 up to the value representative of the datum control.

On the other hand, in hovering flight where the effectiveness of the fin flap D is practically zero, the deflection of said fin flap D is completely transparent to the pilot.

Said device 1A, by virtue of which the fin flap D relieves the rotor R2 to the maximum extent of its capabilities in all the phases of stabilized forward flight, further entails the following advantages, in particular:

control authority in yaw preserved or increased at every point of the flight envelope;

good replication of the control margins, since the position of the rudder pedal 3 is fully representative of the control margin available at the anti-torque auxiliary rotor R2; and yaw control capable of being achieved by the fin flap D, upon a failure of the rotor R2. This is because the device 1A allows, upon such a failure, and as long as the helicopter He maintains sufficient speed, a return to a favorable area and a rolling (sliding) landing under good conditions.

However, a problem of lateral static stability of the helicopter He appears, when said device 1A is used.

In order to remedy this problem, the datum demand is altered, according to the invention, as a function of the lateral load factor of the helicopter He. In order to do this, said device 1A includes means 17 linked to said means 13 for calculating said datum demand, preferably continuously, and forwarding it to said means 13.

As far as the embodiment of the control device 1A of FIG. 2 is concerned, it is known that the pitch of the rotor R2 which corresponds to the travel of a servocontrol, not represented, is representative of the position of the rod linkage 2 of the yaw control system. This position is measured by the potentiometer 11 actuated by the rod linkage 2. The relative difference between the voltage delivered by this potentiometer 11 and a reference voltage corresponding to said datum demand is detected by the means 13 which are produced in the form of a control box and which convert this difference into a speed control demand. This speed control demand is supplied to a box 18 feeding the linear electric actuator 15 of the fin flap D.

Figure 3:
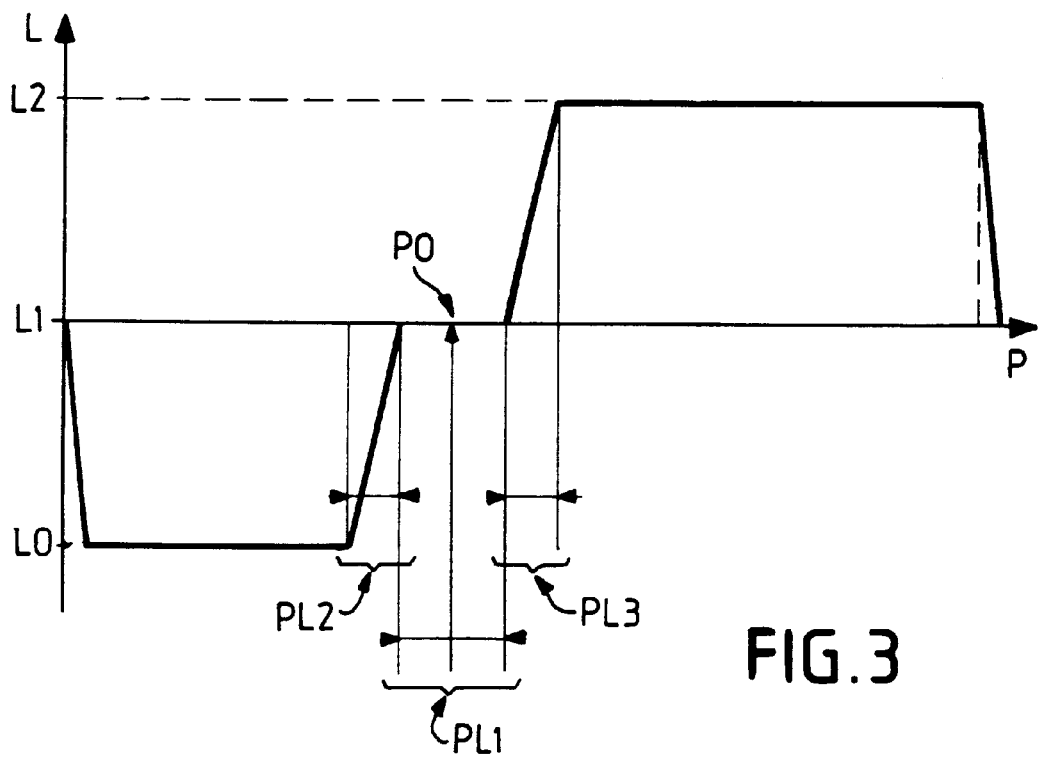
FIG. 3 is a graphical illustration of the control of a fin flap, as a function of the actuation of a rudder pedal, representative of the embodiment of FIGS. 1 and 2.

The speed control demand L for the actuator 15 of the fin flap D has been represented in FIG. 3 as a function of the position P of the rudder pedal 3 (that is to say of the position of the rod linkage 2 of the yaw control system).

In this FIG. 3, three characteristic positions L0, L1 and L2 of said actuator 15 have been represented, which correspond respectively to the retracted position of the rod of the actuator 15, to the stop position of said rod and to the extracted position thereof.

As can be seen in this FIG. 3, a dead control range PL1 appears, centered around a datum position P0 of the rod linkage 2, over which the actuator 15 is inactive.

On the other hand, the latter is actuated in terms of speed during actuation ranges PL2 and PL3 of the same width, which are situated on either side of said dead range PL1. At the extremities of said ranges PL2 and PL3, the actuator 15 is respectively in the positions L0 and L2. In a variant, the actuation ranges PL2 and PL3 may be of different widths.

In order to be able to adapt the control device 1A to the flight conditions, the pilot is able, according to the invention, to set up the above-mentioned essential characteristics.

Figure 4:
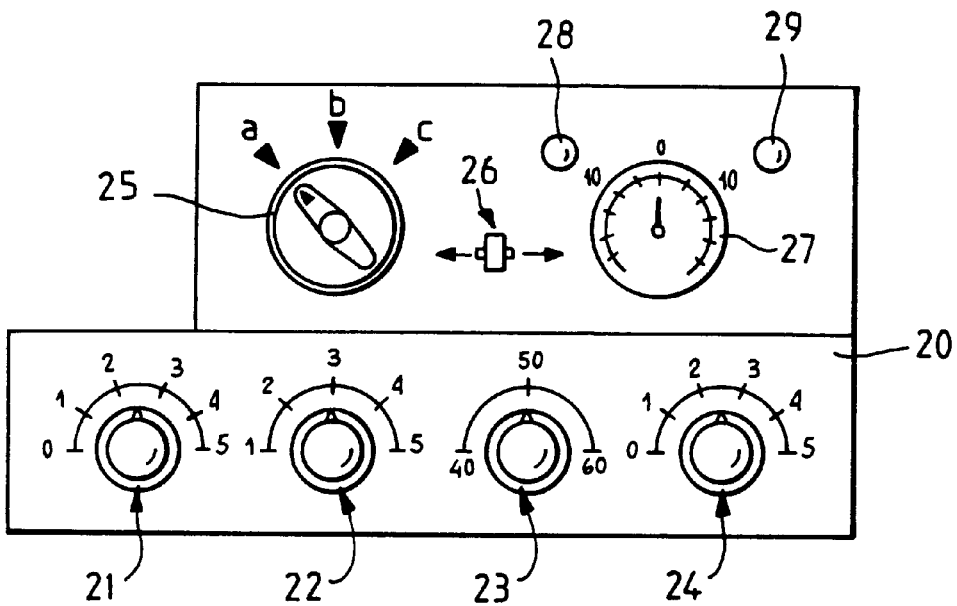
FIG. 4 diagrammatically shows a signaling and setting-up console, in accordance with the invention, used for trimming the control device.

To do this, he has a setting-up and signaling console 20 available, represented in FIG. 4 and installed in the pilot's cabin. This console 20 is provided essentially to assist with trimming the control device in accordance with the invention.

Said console 20 particularly comprises:

means 21 for setting up the width of the actuation ranges PL2 and PL3;

means 22 for setting up the maximum speed of the actuator 15;

means 23 for setting the datum position P0;

means 24 for setting the width of the dead range PL1; and a selector 25 with three positions a, b and c.

Said selector 25 allows the pilot to select one of said three positions, namely:

position a, for which the device 1A is rendered inactive;

position b, for which, the device 1A also being rendered inactive, the pilot can manually control the fin flap D by means of a selector 26, so as to bring it into one of the three above-mentioned positions L0, L1 and L2; and position c, for which the device 1A in accordance with the invention is activated.

Moreover, in order to allow the pilot at any instant to know the situation of the control, said console 24 further includes:

means 27 for signaling the actual value of the angle of deflection of the fin flap D; and indicator lamps 28 and 29 which light up when said fin flap D reaches its extreme positions L0 and L2 respectively.

Figure 6:
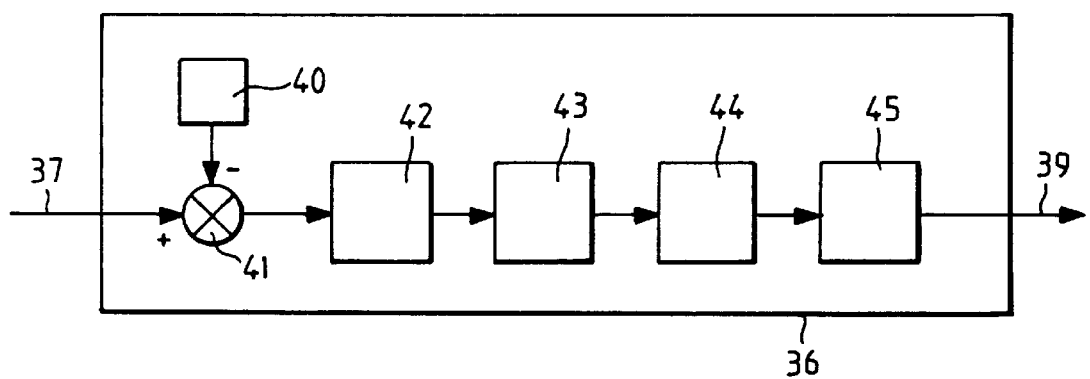
FIG. 6 is the block diagram of a calculating unit of the device of FIG. 5.

Moreover, the second embodiment 1B of the device in accordance with the invention and represented in FIGS. 5 and 6 is applied to a helicopter He including a calculating unit 31, for example of an electrical flight control system, which determines the yaw control demand for the helicopter He, on the basis of information received by means of links 32 and 33 and representative of the actuation respectively of the rudder pedal 3 and of a collective lever 34 of the helicopter He, and which forwards this yaw control demand by means of a link 35 to a member, not represented, for actuating the anti-torque auxiliary rotor R2.

According to the invention, said control device 1B includes:

a calculating unit 36 which determines a speed control demand for the fin flap D, on the basis of the difference between the yaw control demand received via a link 37 connected to said link 35 and the datum demand detailed below; and means 38 connected to the calculating unit 36 via a link 39, for actuating said fin flap D, as a function of the control demand received, the fin flap D being controlled in terms of speed as long as said difference is not zero.

Obviously, the calculating unit 36 represented independently in FIG. 5 may also be incorporated into the calculating unit 31.

Said calculating unit 36 includes, according to the invention, as represented in FIG. 6:

a calculating means 40 for determining a datum demand, for example on the basis of values characteristic of the helicopter He, such as its speed, its altitude or its lateral load factor. Said datum demand is, by definition, representative of a datum control value for the rotor R2;

a subtractor 41 which subtracts said datum demand from the yaw control demand received by the link 37 and thus determines the above-mentioned difference ;

a calculating means 42 for converting said difference which corresponds to a control demand for the rotor R2, into an equivalent demand for positional control of the fin flap D. This conversion is achieved by multiplying said difference by a gain for conversion into effectiveness in terms of yaw moment, of known type;

an integrator 43 which, from this positional control demand, calculates a corresponding speed control demand for the fin flap D;

a low-pass filter 44 which filters the speed control demand thus calculated, since said fin flap D performs only a static function; and a calculating means 45 which limits said demand to the value capable of being executed by said fin flap D and forwarded to it.

The device 1B thus, at equilibrium, ensures the distribution of control sought between the fin flap D and the rotor R2, bringing this latter to the datum control value.

Said device 1B moreover exhibits the following advantages:

it is transparent to control upstream, that is to say that the action of the fin flap D does not alter the sensations upstream of the control system. The overall effectiveness remains identical to the case in which the fin flap D is not active. Consequently, said device 1B needs no modifications or setting up of the flight control laws situated upstream ; and moreover the action of the fin flap D generates no disturbances in the control system.

Moreover, since it is not integrated into the yaw control system but is appended to it, without having to modify said system, the control device in accordance with the invention can be applied to any type of helicopter, using to this end the embodiment 1A for a helicopter equipped with a yaw control system of mechanical type (or even electrical type) and the embodiment 1B for a helicopter equipped with an electrical control system.

What is claimed is:

1. An apparatus for controlling an aerodynamic steering surface of a rudder component of a helicopter (He), said helicopter (He) including a compound anti-torque system which is intended to counteract the torque induced by a main forward-movement and lifting rotor (R1) of the helicopter (He), said apparatus comprising:

an anti-torque auxiliary rotor (R2), controllable and exerting an anti-torque lateral thrust;

a non-rotating rudder component having a movable aerodynamic steering surface (D) with a movable position and which generates an anti-torque transverse lift; and a control system (IA, IB) that controls the speed of movement of said aerodynamic surface (D) as a function of the difference between a helicopter (He) yaw control demand and a datum demand representative of a datum control value for said auxiliary rotor (R2), as long as said difference is not zero.

2. The apparatus as claimed in claim 1, wherein said datum control value is the value for which said auxiliary rotor (R2) exerts zero lateral thrust.

3. The apparatus as claimed in claim 1, additionally comprising at least one rudder pedal (3) for controlling the helicopter (He) in yaw, wherein a yaw control demand is representative of the action exerted by a pilot of the helicopter (He) on said rudder pedal (3).

4. The apparatus as claimed in claim 1, additionally comprising at least one rudder pedal (3) and a collective lever (34), wherein a yaw control demand is determined by a calculating unit (31), from actions exerted respectively on said collective lever (34) and on said rudder pedal (3) by a pilot of the helicopter (He).

5. The apparatus as claimed in claim 1, additionally comprising at least one rudder pedal (3 ) for controlling the helicopter (He) in yaw and a rod linkage (2) connected to said rudder pedal (3) and to a member for actuating said auxiliary rotor (R2), wherein said control system (1A) comprises:

first means (10) for measuring the value of the displacement of said rod linkage (2), which is representative of said yaw control demand;

second means (13) for determining a control demand for the aerodynamic surface (D), from the value thus measured of the displacement of the rod linkage (2); and third means (14) for actuating said aerodynamic surface (D) in terms of speed, as a function of the control demand thus determined.

6. The apparatus as claimed in claim 5, wherein said first means (10) include a potentiometer (11) capable of measuring the displacement of the rod linkage (2).

7. The apparatus as claimed in claim 5, wherein said third means (14) include an electric actuator (15).

8. The apparatus as claimed in claim 1, comprising means (17) for determining said datum demand as a function of the lateral load factor of the helicopter (He).

9. The apparatus as claimed in claim 1, comprising means (25) for rendering said control system (1A) inactive.

10. The apparatus as claimed in claim 1, comprising means (26) allowing a pilot of the helicopter (He) to select and to control at will one of the following three deflection positions of said aerodynamic surface (D): the two extreme positions (L0, L2) and the central position (L1).

11. The apparatus as claimed in claim 5, comprising means (23) for setting a datum position of said rod linkage (2), from which said datum demand is determined.

12. The apparatus as claimed in claim 5, comprising means (24) for setting the width of a dead control range (PL1), for which no control demand is forwarded to said third means (14) for actuating the aerodynamic surface (D).

13. The apparatus as claimed in claim 5, comprising means (21) for setting the width of an actuation range (PL2, PL3) for which said aerodynamic surface (D) is actuated.

14. The apparatus as claimed in claim 5, comprising means (22) for setting the speed of actuation of said third means (14).

15. The apparatus as claimed in claim 1, comprising means (27) for indicating to a pilot of the helicopter (He) the actual value of the angle of deflection of said aerodynamic surface (D).

16. The apparatus as claimed in claim 1, comprising means (28, 29) for warning a pilot of the helicopter (He) when the aerodynamic surface (D) is in one of its two extreme deflection positions (L0, L2).

17. The apparatus as claimed in claim 1, wherein said control system (1B) comprises:

a calculating unit (36), for determining a control demand for the aerodynamic surface (d), on the basis of the difference between the yaw control demand and the datum demand; and means (38) for actuating said aerodynamic surface (D) in terms of speed, as a function of the control demand thus determined.

18. The apparatus as claimed in claim 17, wherein the conversion of said difference which corresponds to a control demand for the auxiliary rotor (R2), into a value which corresponds to a control demand for the aerodynamic surface (D), is performed using a gain for conversion into effectiveness in terms of yaw moment.

19. The apparatus as claimed in claim 17, wherein said calculating unit (36) determines said control demand for the aerodynamic surface (D) by successively carrying out at least on conversion, an integration and a low-pass filtering of said difference between the yaw control demand and the datum demand.

20. A helicopter which includes the apparatus defined by claim 1.

* * * * *